(12) United States Patent  (10) Patent No.: US 7,475,170 B2
Inagaki et al.  (45) Date of Patent: Jan. 6, 2009

(54) DATA TRANSFER DEVICE FOR TRANSFERRING DATA TO AND FROM MEMORY VIA A BUS

(75) Inventors: Junichi Inagaki, Kawasaki (JP); Masao Koyabu, Kawasaki (JP); Jun Tsuiki, Kawasaki (JP); Masahiro Kuramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 11/187,895

(22) Filed: Jul. 25, 2005

(65) Prior Publication Data

US 2006/0212661 A1  Sep. 21, 2006

(30) Foreign Application Priority Data

Mar. 17, 2005 (JP) ............................. 2005-077346
Jun. 27, 2005 (JP) ............................. 2005-186257

(51) Int. Cl.
*G06F 3/00* (2006.01)
*G06F 12/00* (2006.01)

(52) U.S. Cl. ...................... 710/52; 710/53; 710/54; 710/55; 710/56; 710/57; 711/100

(58) Field of Classification Search ................. None
See application file for complete search history.

(56) References Cited

U.S. PATENT DOCUMENTS 5,546,546 A  8/1996  Bell et al.

5,802,055 A  9/1998  Krein et al.
6,301,632 B1  10/2001  Jaramillo
2004/0024948 A1  2/2004  Winkler et al.

FOREIGN PATENT DOCUMENTS

JP  2000-132503  5/2000
KR  2000-0013078  3/2000

OTHER PUBLICATIONS

Korean Patent Office Action issued Aug. 24, 2006 for corresponding Korean Patent Application No. 10-2005-0075718.
Extended European Search Report, mailed Mar. 12, 2007, and issued in corresponding European Patent Application No. 05254556.3-1229.

*Primary Examiner*—Alan S. Chen
(74) *Attorney, Agent, or Firm*—Staas & Halsey LLP

(57) ABSTRACT

The present invention is a data transfer device, which comprises an input/output reception buffer, an input/output transmission buffer, a write data buffer, a read data buffer, a control information table, a write data storing process section, a write data transmission section, a read data buffer storing process section, an input/output transmission buffer storing process section and a control section that executes an access control for controlling the access to the memory by the write data transmission section and the read data buffer storing process section based on a control information table; thereby, a configuration optimum for both protocols of the memory bus and the input/output bus is obtained and the out-of-order execution is also achievable.

10 Claims, 15 Drawing Sheets

FIG. 6

| SEQUENCE ID | MEMORY ADDRESS | READ DATA BUFFER POINTER VALUE |
|---|---|---|
| 1 | | |
| 2 | | |
| 3 | | |
| 4 | | |
| 5 | | |
| 6 | | |
| 7 | | |
| 8 | | |

| SEQUENCE ID | MEMORY ADDRESS | WRITE DATA BUFFER POINTER VALUE |
|---|---|---|
| 1 | | |
| 2 | | |
| 3 | | |
| 4 | | |
| 5 | | |
| 6 | | |
| 7 | | |
| 8 | | |

11c

| SEQUENCE ID | IDENTIFICATION BIT | MEMORY ADDRESS | READ DATA BUFFER POINTER VALUE/WRITE DATA BUFFER POINTER VALUE |
|---|---|---|---|
| 1 | | | |
| 2 | | | |
| 3 | | | |
| 4 | | | |
| 5 | | | |
| 6 | | | |
| 7 | | | |
| 8 | | | |

11d

DATA TRANSFER DEVICE FOR TRANSFERRING DATA TO AND FROM MEMORY VIA A BUS

BACKGROUND OF THE INVENTION (1) Field of the Invention

The present invention relates to a technique of effecting a control of data transfer in, for example, a bus bridge and the like.

(2) Description of Related Art

Recently, input/output (I/O) devices conforming to high-speed communication standard such as gigabit Ethernet and fiber channel have been accepted. To keep pace with this, information-processing devices also require the improvement of the data transfer performance in, for example, bus bridge for effecting data transfer between I/O bus and memory bus.

FIG. 14 schematically shows a configuration of a conventional bus bridge; and FIG. 15 schematically shows a configuration of an information-processing device equipped with the bus bridge. An information-processing device 100 shown in FIG. 15 includes central processing units (CPUs) 21-1 and 21-2, system controllers 23-1 and 23-2, bus bridges 20-1 and 20-2, a cross bar switch 24, memories 22-1, 22-2, 22-3 and 22-4 and I/O devices 25.

To the system controller 23-1, the CPU 21-1, the memories 22-1 and 22-2 and the cross bar switch 24 are connected; also to the system controller 23-2, the CPU 21-2, the memories 22-3 and 22-4 and the cross bar switch 24 are connected, respectively.

To the bus bridges 20-1 and 20-2, two I/O devices 25 are connected via an I/O bus 26 respectively; and these bus bridges 20-1 and 20-2 are connected to the cross bar switch 24 via a memory bus 27 respectively.

That is, each of the system controllers 23-1 and 23-2 is connected to the bus bridge 20-1, 20-2 respectively via the cross bar switch 24 so as to be capable of communicating therebetween.

Hereinafter, as for the reference numeral indicating the bus bridge, when one of plural bus bridges has to be specified, reference numerals 20-1 and 20-2 will be used; but when an arbitrary bus bridge is indicated, reference numeral 20 will be used.

As shown in FIG. 14, between the I/O devices 25 and the cross bar switch 24, the bus bridges (memory I/O bus bridges) 20 are disposed between the I/O buses 26 and the memory buses 27, and are arranged in such a manner as to transfer data between these I/O buses 26 and the memory buses 27 of which protocols such as clock frequency and data length of the data to be transferred are different from each other.

In the information processing device 100 equipped with the conventional bus bridges 20, the memory bus 27 includes a write data signal line 27b through which write data and request (address) for writing the data in the memories 22-1 to 22-4 are transmitted and a read data signal line 27a through which read data read out from the memories 22-1 to 22-4 are transmitted. Also, the I/O bus 26 includes an I/O reception signal line 26a for receiving data from the I/O devices 25 and an I/O transmission signal line 26b for transmitting data to the I/O devices 25.

As shown in FIG. 14, the conventional bus bridge 20 includes a transmission buffer 201, a reception buffer 202 and a control information table 203.

The transmission buffer 201 is adapted for temporarily storing the data read out from the memories 22-1 to 22-4 to carry out direct memory access (DMA) read. To the transmission buffer 201, an I/O transmission signal line 26b and a read data signal line 27a are connected so as to be capable of communicating therebetween, and the arrangement is made such that the data from the memories 22-1 to 22-4 are stored in the transmission buffer 201 via the read data signal line 27a, and the read data stored in the transmission buffer 201 are transmitted to the I/O devices 25 via the I/O transmission signal line 27b.

The reception buffer 202 is adapted for temporarily storing the data to be written in the memories 22-1 to 22-4 to carry out DMA write. To the reception buffer 202, an I/O reception signal line 26a and a write data signal line 27b are connected so as to be capable of communicating therebetween. And the arrangement is made such that the data from the I/O devices 25 are stored in the reception buffer 202; and based on the control information stored in the control information table 203, the data stored in the reception buffer 202 are transmitted to the memories 22-1 to 22-4 as the write data via the write data signal line 27b.

That is, in the conventional bus bridge 20, as shown in FIG. 14, the memory bus 27 and the I/O bus 26 commonly use the transmission buffer 201 and the reception buffer 202. Also, the memory bus 27 is arranged such that the request and the data are transmitted via the same write data signal line 27b. In the memory bus 27, the request and the data are processed as the same packet. In the event of processing a plurality of memory requests at the same time, the in-order execution in terms of the pertinent process is performed.

The transmission buffer 201 and the reception buffer 202 are arranged such that the data are stored and read out in a manner of first-in first-out (FIFO).

The control information table 203 is adapted for controlling the access to the memories 22-1 to 22-4. The control information table 203 is adapted for effecting a control for transmitting request to the memories 22-1 to 22-4, reading out the read data to be stored in the transmission buffer 201, transmitting the write data stored in the reception buffer 202 to the memories 22-1 to 22-4 and the like.

The conventional bus bridge 20 configured as described above transmits the data from the I/O devices 25 to the memories 22-1 to 22-4 and transmits the data stored in the memories 22-1 to 22-4 to the I/O devices 25; thus, the conventional bus bridge 20 performs data transfer between the I/O bus 26 and the memory bus 27.

As described above, in the conventional bus bridge 20 it is desirable to have the performance of data transfer enhanced. For example, Japanese Patent Laid-Open (Kokai) No. 2000-132503 discloses a data transfer device in which interface board including a target is provided with a plurality of reception buffers so that an initiator can process the data efficiently.

However, in the conventional bus bridge 20, the arrangement is made such that as circuit configuration the circuit is provided with a transmission buffer 201 and a reception buffer 202 each, so that there is caused a disadvantage in that the transmission buffer 201 and the reception buffer 202 are hardly configured to be optimum for both protocols of the memory bus 27 and the I/O bus 26.

Also, there occurs the following economical disadvantage. That is adapted for example, in the I/O bus 26 or memory bus 27, when a protocol such as bus clock or data length is changed, the conventional bus bridge 20 cannot cope with such changes. Accordingly, the entire bus bridge 20 has to be changed for a new one.

Further, generally, in processor unit such as CPU, there is known a technique in which instructions in a program are executed in disregard of the order described in the program (out of order execution) to achieve the high speed of the processing.

Also, there is known such a technique in which, in the bus bridge 20, the packets to be transmitted to the memory bus 27 are processed and transmitted with the address portion and the data portion being dealt with as separate packets.

However, in the conventional bus bridge 20, both of the I/O transmission buffer 201 and the I/O reception buffer 202 are arranged such that the data are read and written in a manner of FIFO. Therefore, the out-of-order execution cannot be carried out by the technique in which the address portion and the data portion are handled as separate packets.

Further, in the conventional bus bridge 20, there is the following problem. That is, when a virtual channel function in which a physically one I/O bus 26 is used as if pluralities of channels were virtually connected, is to be carried out, no overtaking control of packet can be effected.

SUMMARY OF THE INVENTION

The present invention has been devised in view of the above-described problems. Accordingly, it is an object of the present invention to provide a data transfer device and an information processing device, which have a configuration optimum for the protocols of both of memory bus and input/output bus, and furthermore is capable of performing the out-of-order execution.

Therefore, a data transfer device according to the present invention is adapted to transfer data between a memory bus, being connected in such a manner as to be capable of communicating request, write data and read data as a packet respectively in communication with a memory, equipped with a request signal line, a write data signal line and a read data signal line and an input/output bus equipped with a transmission signal line and a reception signal line through which the transmission data and the reception data are transmitted to or received from an input/output apparatus respectively as a packet including transmission data and transmission address of the transmission data and a packet including reception data and reception address of the reception data, includes: an input/output reception buffer capable of storing the reception data received from the input/output apparatus through the reception signal line; an input/output transmission buffer capable of storing the transmission data transmitted to the input/output apparatus through the transmission signal line; a write data buffer capable of storing the write data to be transmitted to the memory through the write data signal line; a read data buffer capable of storing the read data received from the memory through the read data signal line; a control information table having a plurality of entries formed corresponding to the access to the memory; a write data buffer storing process section that stores the reception data stored in the input/output reception buffer in the write data buffer; a write data transmission section that transmits the reception data stored in the write data buffer to the memory as the write data through the write data signal line; a read data buffer storing process section that stores the read data received from the memory in the read data buffer; an input/output transmission buffer storing process section that reads out the read data stored in the read data buffer and stores the data as the transmission data along with the transmission address of the transmission data into the input/output transmission buffer; and a control section that controls the access to the memory made by the write data transmission section and the read data buffer storing section based on the control information table.

The arrangement may be made such that, when performing write processing to transfer data from the input/output apparatus to the memory, the write data transmission section transmits the write data, which is formed by dividing the reception data stored in the write data buffer into a memory access size, through the write data signal line.

Also, The arrangement may be made such that the control information table establishes the correspondence between the request and the storing position information where the write data corresponding to the request in the write data buffer are stored and administers them, when transmitting the data to the memory bus, the control section reads out the storing position information in said write data buffer written at the entry of the control information table using the sequence ID as a pointer and takes out the write data from the write data buffer based on the storing position information.

Further, the arrangement may be made such that, when performing read processing to transfer the data from the memory to the input/output apparatus, in the event that total data amount of a plurality of the read data stored in the read data buffer satisfies the conditions of transmission packet size, the input/output transmission buffer storing process section reads out the read data stored in the read data buffer, and stores the data in the input/output transmission buffer along with the transmission address of the transmission data as the transmission data.

Furthermore, the arrangement may be made such that the control information table establishes the correspondence between at least the sequence ID associated with the request and the storing position information with respect to a storing position of the read data corresponding to the request in the read data buffer and administers them, and that, when receiving the read data from the memory bus, the control section reads out the storing position information in said read data buffer written at the entry of the control information table using the sequence ID as the pointer, and stores the read data in the read data buffer based on the storing position information.

Further, the arrangement may be made such that the control information table stores the storing position information of said read data buffer and the storing position information of said write data buffer in the same field, and stores identification information for discriminating the read processing from the write processing in correspondence to the request.

As described above, according to the present invention, at least one of the following effects and advantages is obtained:

(1) the performance of data transfer is increased;

(2) a suitable configuration to both protocols of the memory bus and the input/output bus is obtained;

(3) even when the virtual channel function is carried out, the overtaking control of packet is carried out;

(4) out-of-order execution of the read data can be performed in the memory bus; and

BRIEF DESCRIPTION OF THE DRAWINGS

FIG. 6 shows an example of structure of a control information table in the bus bridge in accordance with the second embodiment of the present invention;

FIG. 8 shows an example of structure of a control information table in a bus bridge as a third embodiment of the present invention;

DESCRIPTION OF THE PREFERRED EMBODIMENTS

Hereinafter, embodiments of the present invention will be described.

(A) Description of First Embodiment

Figure 1:
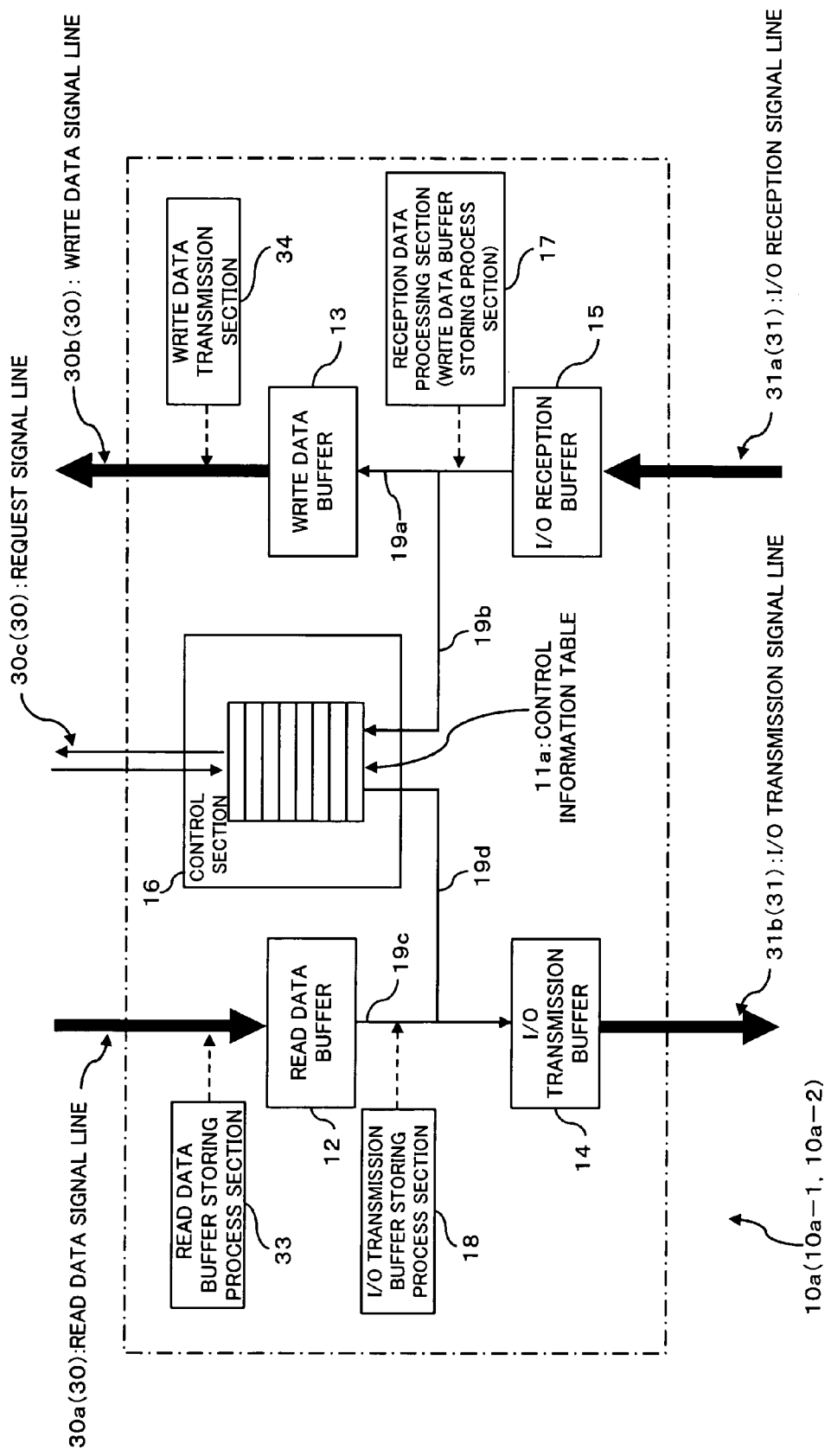
FIG. 1 schematically shows a configuration of a bus bridge (data transfer device) as a first embodiment of the present invention.
Figure 2:
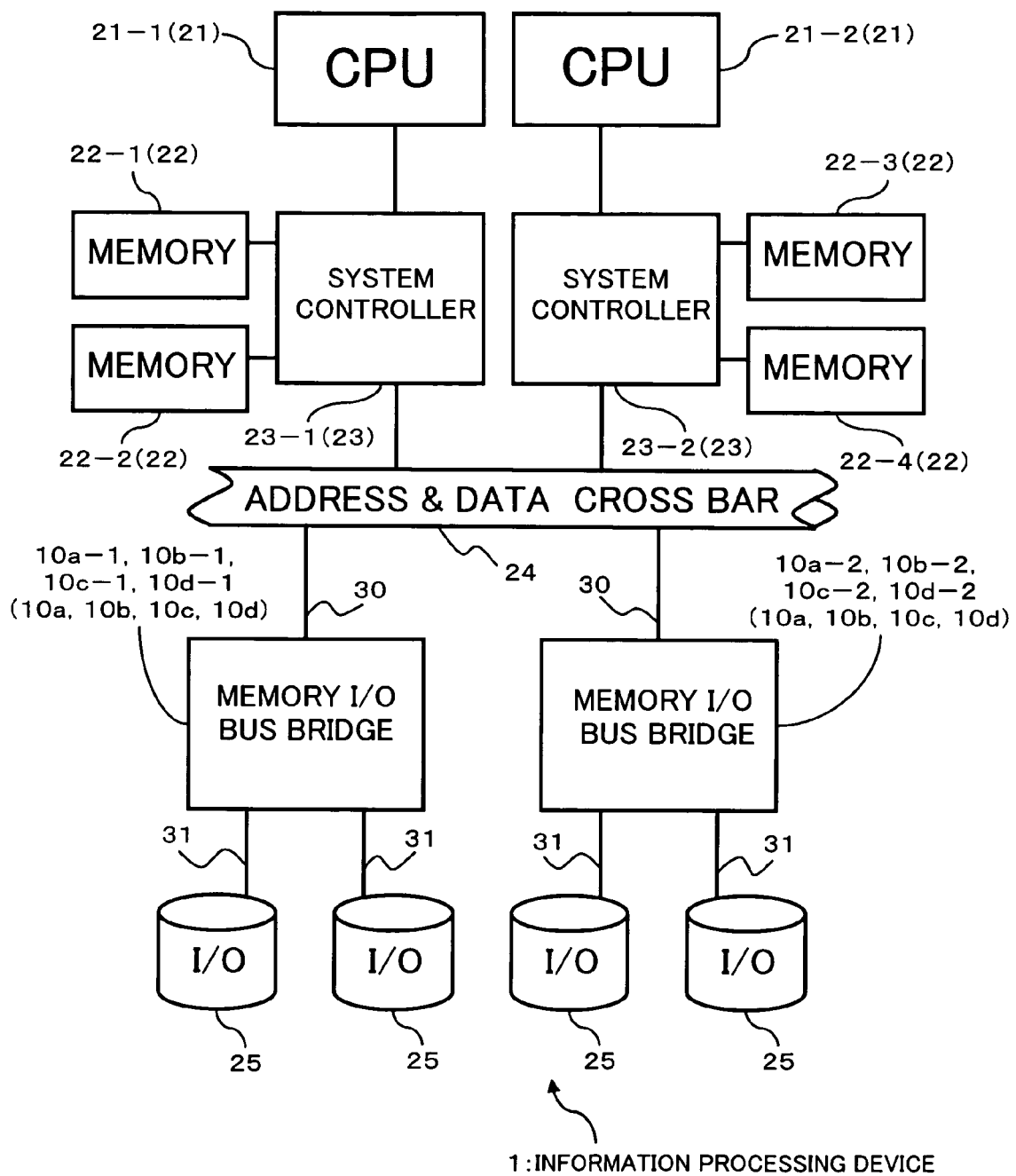
FIG. 2 schematically shows a configuration of an information-processing device equipped with a bus bridge.

FIG. 1 schematically shows a configuration of a bus bridge (data transfer device) as a first embodiment of the present invention; and FIG. 2 schematically shows a configuration of an information-processing device equipped with the bus bridge.

As shown in FIG. 2, the information-processing device 1 includes CPUs (Central Processing Units) 21-1 and 21-2, system controllers 23-1 and 23-2, memories 22-1, 22-2, 22-3 and 22-4, a cross bar switch 24, I/O devices 25 and bus bridges 10a-1 and 10a-2.

The CPUs 21-1 and 21-2 execute an OS (Operating System) and application programs, thereby carry out various kinds of operation processes.

The system controllers 23-1 and 23-2 are adapted for administering the transmission and reception of data among the CPUs 21-1 and 21-2, the memories 22-1 to 22-4, the I/O devices 25 and the like. The system controller 23-1 is connected to the CPU 21-1, the memories 22-1 and 22-2 and the cross bar switch 24 so as to be able to communicate therebetween, and is arranged in such a manner as to administer the transmission and reception of data between the CPU 21-1 and the memories 22-1 and 22-2 and the cross bar switch 24.

Also, the system controller 23-2 is connected to the CPU 21-2, the memories 22-3 and 22-4 and the cross bar switch 24 so as to be able to communicate therebetween, and is arranged in such a manner as to administer the transmission and reception of data between the CPU 21-2 and the memories 22-3 and 22-4 and the cross bar switch 24.

The memories 22-1 to 22-4 are for storing data, instructions and the like, which are used by the CPUs 21-1 and 21-2 when executing the operation. Hereinafter, as for the reference numerals indicating the memories, when it is necessary to designate one memory from among the plurality of memories, reference numerals 22-1 to 22-4 will be used. However, when specifying an arbitrary memory, reference numeral 22 will be used.

The cross bar switch 24 is adapted for dynamically selecting transmission path for data (address and object data) when the data are transferred and received between the CPU 21-1 and 21-2, the memories 22-1 to 22-4 and the like. In an example shown in FIG. 2, the cross bar switch 24 is connected to the system controllers 23-1 and 23-2 so as to be able to communicate therebetween, and is connected to the bus bridges 10a-1 and 10a-2 via a memory bus 30 respectively so as to be able to communicate therebetween.

The I/O (Input/Output) devices 25 are various electronic devices, which are mounted on the information processing device 1 such as hard disk, scanner or the like, and are connected to the bus bridges 10a-1 and 10a-2 via an I/O bus (input/output bus) 31 respectively so as to be able to communicate therebetween.

As shown in FIG. 1, the memory bus 30 includes a read data signal line 30a, a write data signal line 30b and a request signal line 30c; and connects the bus bridges 10a-1 and 10a-2 to the memory 22 via cross bar switch 24 so as to be able to communicate with each other. The arrangement is made such that read data are received in the read data signal line 30a; the write data are transmitted in the write data signal line 30b and further, in the request signal line 30c, request (address) is transmitted as a packet (packet format), respectively. Descriptions about the request, the write data and the read data will be made later.

In this embodiment, the arrangement is made such that the request is transmitted eight times consecutively from the bus bridges 10a-1 and 10a-2 respectively without receiving any response from the memory 22; and further, the data length (memory access size) of one packet of the read data and write data is fixed to 128 bytes.

The I/O buses 31 connect the I/O devices 25 and the bus bridges 10a-1 and 10a-2 so as to be able to communicate with each other, and include an I/O reception signal line (reception signal line) 31a and an I/O transmission signal line (transmission signal line) 31b. The I/O reception signal line (reception signal line) 31a is adapted for receiving reception data from the I/O devices 25. The I/O transmission signal line (transmission signal line) 31b is adapted for transmitting transmission data to the I/O devices 25. The arrangement is made such that physically two different signal lines are used for receiving and transmitting data. In this point, the arrangement is made such that full duplex transmission and reception is carried out.

Further, the I/O transmission signal line 31b is arranged such that the data are transmitted as a packet including the transmission data and the transmission address of the transmission data. The I/O reception signal line 31a is arranged such that the reception data are received as a packet including the reception data and the reception address of the reception data. Further, the data length of a packet of the reception data and the transmission data, which are transmitted and received through the I/O reception signal line 31a and the I/O transmission signal line 31b, is a variable length up to maximum 4 Kbytes.

Between the I/O devices 25 and the cross bar switch 24, the bus bridges 10a-1 and 10a-2 are disposed between the I/O buses 31 and the memory buses 30, and are arranged such that data are transferred between the I/O buses 31 and the memory buses 30, which have protocols such as clock frequency, data length and the like of the data to be transferred different from each other.

Hereinafter, in the first embodiment, as for the reference numerals for indicating the bus bridges, when one of the pluralities of bus bridges is specified, reference numerals 10a-1 and 10a-2 will be used; when an arbitrary bus bridge is indicated, reference numeral 10a will be used.

As shown in FIG. 1, the bus bridge 10a of the first embodiment includes a read data buffer 12, a write data buffer 13, an I/O transmission buffer (input/output transmission buffer) 14, an I/O reception buffer (input/output reception buffer) 15, a control section 16, a control information table 11a, a reception data processing section (write data buffer storing process section) 17, an I/O transmission buffer storing process section (input/output transmission buffer storing process section) 18, buses 19a, 19b, 19c and 19d, a read data buffer storing process section 33 and a write data transmission section 34.

The I/O reception buffer (input/output reception buffer) 15 temporarily stores the data to be received from I/O device 25. To the I/O reception buffer 15, the I/O reception signal line 31a and the bus 19a are connected so as to be able to communicate with each other; and is arranged such that the I/O reception data (reception data) received from the I/O device 25 are stored in the I/O reception buffer 15. In the I/O reception buffer 15, the arrangement is made such that the I/O reception data are stored and read out in a manner of FIFO (First In First Out).

Also, in the bus bridge 10a of the first embodiment, the arrangement is made such that a virtual channel function is carried out, in which a physically one I/O bus 31 is handled as if a plurality of channels were virtually connected. To carry out the virtual channel function, pointers of read and write with respect to the I/O reception buffer 15 are given to each virtual channel.

The reception data processing section 17 receives the data from the I/O bus 31, and processes the packets stored in the I/O reception buffer 15. In particular, the reception data processing section 17 is arranged in such a manner as to take out a packet written in the I/O reception buffer 15, determine whether the take out packet is a read request or a write request, divide the header of the received packet into a memory access size (in this embodiment, 128 bytes), and transfer necessary information (control information) to control section 16 to store the data in the control information table 11a.

Also, the reception data processing section (write data buffer storing process section) 17 stores the I/O reception data stored in the I/O reception buffer 15 in the write data buffer 13. The reception data processing section 17 is arranged in such a manner as, when carrying out a write processing (write transaction) to transmit the write data to the memory bus 30, to read out the I/O reception data from the I/O reception buffer 15, separate the I/O reception data to a header portion and a data portion other than the header portion, and write the data portion in the write data buffer 13 until the write data buffer 13 has a full state or the I/O reception buffer 15 has an empty state.

The write data buffer 13 stores write data to be transmitted via the write data signal line 30b to write the data in the memory 22. The write data buffer 13 is connected to the write data signal line 30b and the bus 19a so as to be able to communicate with each other, and the arrangement is made such that the write data is stored by the reception data processing section 17.

The write data transmission section 34 is arranged such that, when the write data transmission from the memory bus 30 is permitted with respect to a write data transmission request (detailed description will be given later) transmitted to the memory bus 30 from the control section 16, which will be described later, write data of 128 bytes each in data size of one packet are generated, and the generated write data are transmitted via the memory bus 30b.

The read data buffer 12 stores read data received from the memory 22 via the read data signal line 30a. The read data buffer 12 is arranged such that, when the control section 16 transmits a read request, of which description will be given later, an area corresponding to the read data length to be received is secured before hand, and in response to the read request, the read data received from the memory 22 is stored in the secured area. Thereby, it is made possible to prevent the occurrence of an overflow of the read data buffer 12 due to the read data.

The read data buffer 12 is arranged such that a pointer indicating the area, which is secured corresponding to the transmitted read request, is stored in the control information table 11a.

The read data buffer storing process section 33 stores read data received from the memory 22 via the read data signal line 30a in the read data buffer 12. The read data buffer storing process section 33 is arranged in such a manner as to make reference to the control information table 11a to obtain a pointer indicating its storing place of the received read data in the read data buffer 12, and store the received read data in the storing place.

The I/O transmission buffer storing process section (input/output transmission buffer storing process section) 18 reads out read data stored in the read data buffer 12 and stores the data in the I/O transmission buffer 14 as the transmission data along with a header (transmission address) related to the transmission data.

The I/O transmission buffer storing process section 18 is adapted so as, when the read data filling a capacity (conditions of transmission packet size) for one packet transmitted via the I/O bus 31 are stored in the read data buffer 12, i.e., when the conditions of transmission packet size is fulfilled, to read out the read data of one packet stored in the read data buffer 12, and store the data in the I/O transmission buffer 14 as transmission data along with the transmission address of the transmission data.

The I/O transmission buffer (input/output transmission buffer) 14 stores transmission data transmitted to the I/O device 25 via the I/O transmission signal line 31b. The I/O transmission buffer 14 is arranged such that the read data are stored and read out in a manner of FIFO. Also, the I/O transmission buffer 14 is connected to the I/O transmission signal line 31b and the bus 19c so as to be able to communicate with each other.

The bus 19a connects the I/O reception buffer 15 and the write data buffer 13 therebetween so as to be able to communicate with each other. The bus 19b connects the I/O reception buffer 15 and the control information table 11a so as to be able to communicate with each other. The bus 19c connects the read data buffer 12 and the I/O transmission buffer 14 so as to be able to communicate with each other. And the bus 19d connects the control information table 11a and the I/O transmission buffer 14 so as to be able to communicate with each other.

The control information table 11a has eight entries (field), and administers a request transmitted to the memory bus 30. These entries of the control information table 11a is arranged such that, when a request is transmitted to the memory bus 30 from the control section 16, the control information is registered by the control section 16; and that, when the data transfer through the memory bus 30 has been completed, the control information is deleted by the control section 16.

Here, the control information stored in the entries of the control information table 11a includes, for example, a pointer indicating the area secured by the read data buffer 12 in response to the transmitted read request.

The control section 16 executes access control for controlling the access to the memory 22 (memory bus 30) by the write data transmission section 34 and the read data buffer storing process section 33 based on the control information table 11a. In particular, the control section 16 transmits requests (address) such as read request and write request to the memory bus 30.

The process in the bus bridge 10a as the first embodiment of the present invention constituted as described above, at the time of transferring write data will be described in accordance with the sequence shown in FIG. 3.

When a packet of I/O reception data (reception data, write data) transmitted from the I/O device 25 is transmitted to the bus bridge 10a via the I/O bus 31 (I/O reception signal line 31a) (refer to arrow A10 in FIG. 3) in the bus bridge 10a, the packet received from the I/O bus 31 is written in the I/O reception buffer 15.

Then, the reception data processing section 17 takes out the packet written in the I/O reception buffer 15 from the I/O reception buffer 15, and when the taken out packet is write data, takes out the header and divides the data into 128 bytes and the control section 16 registers necessary information (control information) in the control information table.

Also, the reception data processing section 17 writes the data portion of the packet written in the I/O reception buffer 15 in the write data buffer 13.

The arrangement is made such that, when the virtual channel function, being implemented, read pointer and write pointer in the I/O reception buffer 15 are prepared for each virtual channel, and a packet having the higher priority is processed first.

Figure 3:
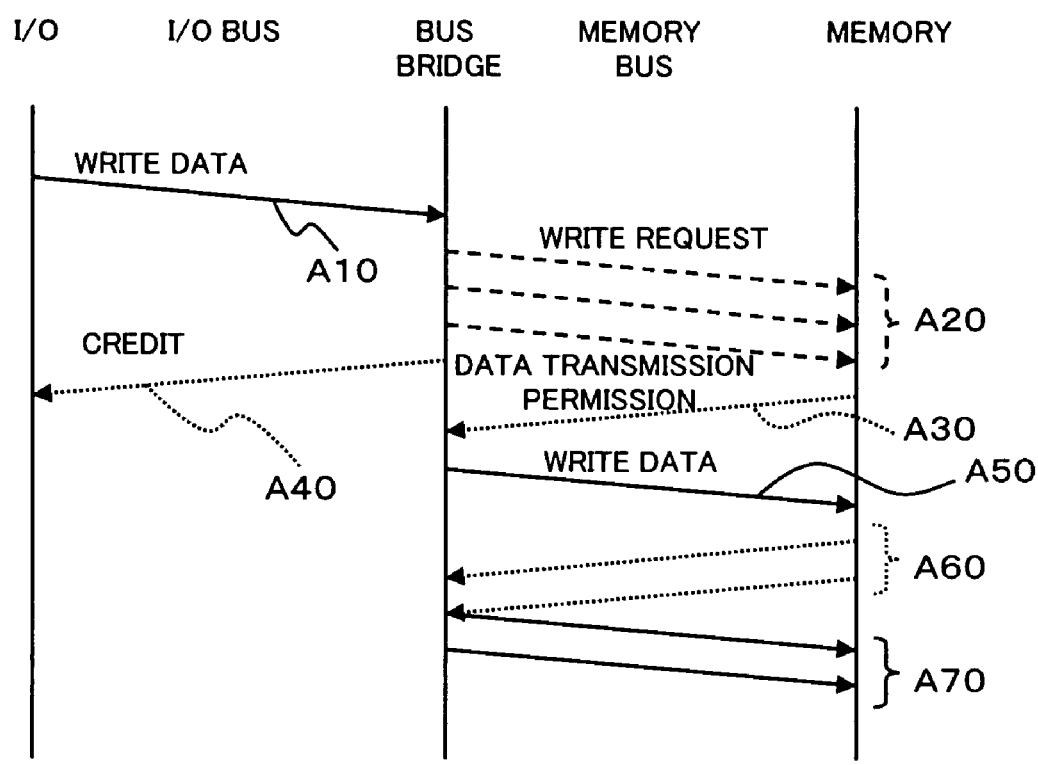
FIG. 3 is a sequence diagram illustrating a process at transferring write data in the bus bridge as the first embodiment of the present invention.

The control section 16 creates a write request based on the header information divided into 128 bytes each and transmits the data to the memory bus 30 (refer to arrow A20 in FIG. 3). When a data transmission permission packet is transmitted from the memory 22 (memory bus 30) in response to these write requests (refer to arrow A30 in FIG. 3), a credit indicating available space of the I/O reception buffer 15 is transmitted to the I/O device 25 from the bus bridge 10a (refer to arrow A40 in FIG. 3), and the write data transmission section 34 transmits the write data to the memory 22 via the write data signal line 30b (refer to arrow A50 in FIG. 3).

After that, every time when the data transmission permission packet is transmitted from the memory 22 (memory bus 30) (refer to arrow A60 in FIG. 3), the write data transmission section 34 transmits write data to the memory 22 (refer to arrow A70 in FIG. 3).

Next, the process in the bus bridge 10a as the first embodiment of the present invention at the time of transferring the read data will be described in accordance with the sequence shown in FIG. 4. When a packet of the I/O reception data (reception data, read request) transmitted from the I/O device 25 is transmitted to the bus bridge 10a via the I/O bus 31 (I/O reception signal line 31a) (refer to arrow B10 in FIG. 4), in the bus bridge 10a, the packet received from the I/O bus 31 is written in the I/O reception buffer 15.

The reception data processing section 17 takes out a packet written in the I/O reception buffer 15 from the I/O reception buffer 15. When the taken-out packet is a read request, the reception data processing section 17 extracts the header thereof and divides it into 128 bytes each, and registers the information necessary for the control section 16 to the control information table.

When the virtual channel function is carried out, the arrangement is made such that the read pointer and write pointer in the I/O reception buffer 15 are prepared for each virtual channel; and a packet having the higher priority is processed first.

Figure 4:
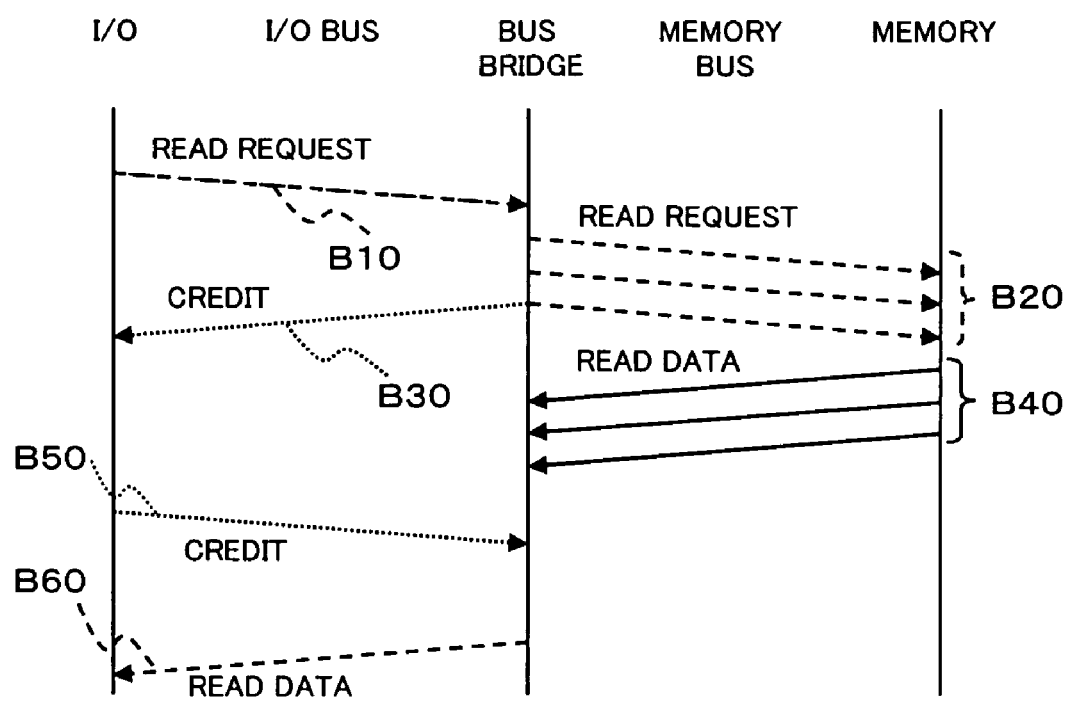
FIG. 4 is a sequence diagram illustrating a process at the time of transferring read data in the bus bridge as the first embodiment of the present invention.

The control section 16 creates a read request based on the header information divided into 128 bytes, and transmits the request to the memory bus 30 (refer to arrow B20 in FIG. 4). Also, a credit indicating an empty state of the I/O reception buffer 15 is transmitted from the bus bridge 10a to the I/O device 26 (refer to arrow B30 in FIG. 4). The read data are transmitted from the memory 22 (memory bus 30) in response to the read request (refer to arrow B40 in FIG. 4), and the read data buffer storing process section 33 stores the read data received via the memory bus 30a in the read data buffer 12.

When the read data for one packet in the I/O bus 31 is fulfilled in the read data buffer 12, the I/O transmission buffer storing process section 18 takes out read data from the read data buffer 12 and writes the data in the I/O transmission buffer 14.

When the transmission of the read data is permitted by a credit (refer to arrow B50 in FIG. 4), the I/O transmission buffer 14 transmits a read data packet to the I/O bus 31 (I/O transmission signal line 31b) (refer to arrow B60 in FIG. 4).

As described above, the bus bridge 10a according to the first embodiment of the present invention includes the read data buffer 12, the write data buffer 13, the I/O transmission buffer 14 and the I/O reception buffer 15. Accordingly, an exclusive buffer for the memory bus 30 and the I/O bus 31 respectively, so that the buffer size and the pointer control method adaptable to the both protocols of the memory bus 30 and the I/O bus 31 can be adopted.

Also, even when the protocol or the like of either one of the memory bus 30 and the I/O bus 31 is changed, only any one of the read data buffer 12, the write data buffer 13, the I/O transmission buffer 14 and the I/O reception buffer 15 has to be changed so as to be capable of handling the changed protocol. Thus, the configuration has flexibility, versatility and a satisfactory economical efficiency.

Also, the bus bridge 10a is capable of handling the overtaking control of a packet when the virtual channel function is carried out.

Further, the memory bus 30 includes the request signal line 30c, the write data signal line 30b and the read data signal line 30a, and through these signal lines, transmission and reception of data is carried out in each packet format. Accordingly, when the bus bridge 10a of the present invention is applied to a large-scale system having a plurality of system controllers 23-1 and 23-2 for controlling the CPUs 21-1 and 21-2 and the memory 22, there is transmitted the data to be actually processed to the system controllers 23-1 and 23-2 after transmitting the request from the control section 16 and after receiving notification from the destination of the data, whereby the performance of data transfer is increased.

(B) Description of Second Embodiment

Figure 5:
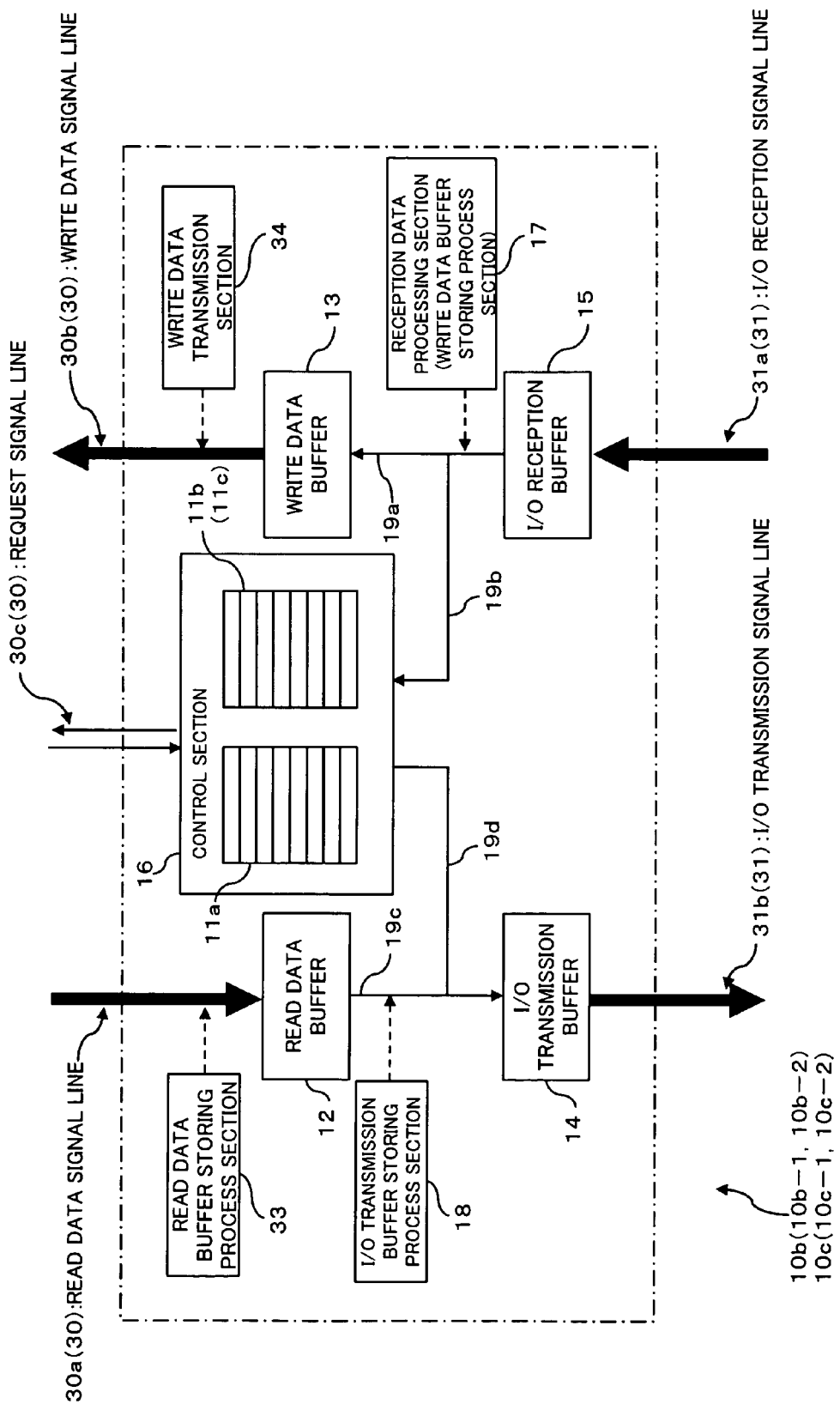
FIG. 5 schematically shows a configuration of a bus bridge as a second embodiment of the present invention.

FIG. 5 schematically shows a configuration of a bus bridge 10b as a second embodiment of the present invention. FIG. 6 shows an example of structure of a control information table in the bus bridge 10b as the second embodiment of the present invention.

As is also the case with the bus bridge 10a of the first embodiment, between the I/O devices 25 and the cross bar switch 24 in the information processing device 1 (refer to FIG. 2), the bus bridges 10b (10b-1, 10b-2) as the second embodiment are disposed between the I/O buses 31 and the memory bus 30. The bus bridge 10b is arranged in such a manner as to perform the data transfer between the I/O buses 31 and the memory bus 30, which have different protocols such as clock frequency, data length or the like of the data to be transferred therebetween.

Hereinafter, in the second embodiment, as for the reference numeral indicating the bus bridge, when one of a plurality of bus bridges has to be specified, reference numerals 10b-1 and 10b-2 will be used; and when specifying an arbitrary bus bridge, reference numeral 10b will be used.

As shown in FIG. 5, the bus bridge 10b of the second embodiment includes a control information table 11b in the bus bridge 10a of the first embodiment, and other portions thereof are constituted in the same manner as those of the bus bridge 10a of the first embodiment. In the figures, the same reference numerals as the above-described reference numerals denote the same or substantially same portions; therefore, the detailed description thereof is omitted.

In the bus bridge 10b of the second embodiment, the arrangement is made such that, for each of the read requests (maximum eight) under execution, which are transmitted by the control section 16, there is to be set a unique sequence ID respectively, and with these sequence IDs, each of the read requests is administered.

Further, in the bus bridge 10b of the second embodiment, the read data, which are received from the memory bus 30 also have the above-mentioned sequence ID in the packet header portion thereof. Furthermore, in the bus bridge 10b of the second embodiment, the read data do not always arrive from the memory bus 30 in the order that the requests are transmitted from the control section 16. But the arrangement is made such that the data, of which process by the CPU 21 or the memory 22 have completed, are received in order via the memory bus 30 (out of order execution), and the read data buffer storing process section 33 stores the read data received from the memory bus 30 in predetermined positions in the read data buffer 12 while referring to the control information table 11b based on the sequence ID.

As shown in FIG. 6, in each of eight entries, the control table 11b is constituted with sequence ID, memory address and read data buffer pointer value (RD buffer pointer value; storing position information) being caused to correspond to each other as control information. That is, the control information table 11b administers at least the sequence ID associated with a request and the storing position information with respect to the storing position of the read data associated with the request in the read data buffer 12 being caused to correspond to each other.

The read data buffer pointer value is a pointer value that indicates the area secured beforehand to store the read data to be received corresponding to the read request when the control section 16 transmits the read request to the memory bus 30. The write pointer of the read data buffer 12 is arranged in such a manner as, not only to operate in an incremental manner, but also to control handle a random value, whereby the out-of-order execution can be performed.

The read data buffer storing process section 33 is arranged in such a manner as, when receiving the read data, using the sequence ID attached to the read data, to refer to the control information table 11b to read out the pointer value of the read data buffer 12 from the entry corresponding to the sequence ID, and determines the storing position of the read data.

That is, the bus bridge 10b of the second embodiment is arranged such that each of the entries in the control table 11b is specified by the sequence ID associated with each entry. In the example shown in FIG. 5, eight entries constituting the control table 11b are allotted a sequence ID of a natural number 1-8 respectively.

The entry to be used in the control table 11b is determined pursuant to the sequence ID.

Also, the bus bridge 10b of the second embodiment also is arranged such that, when the read data for one packet have been received in the read data buffer 12, the I/O transmission buffer storing process section 18 transfers the data to the I/O transmission buffer 14.

Figure 7:
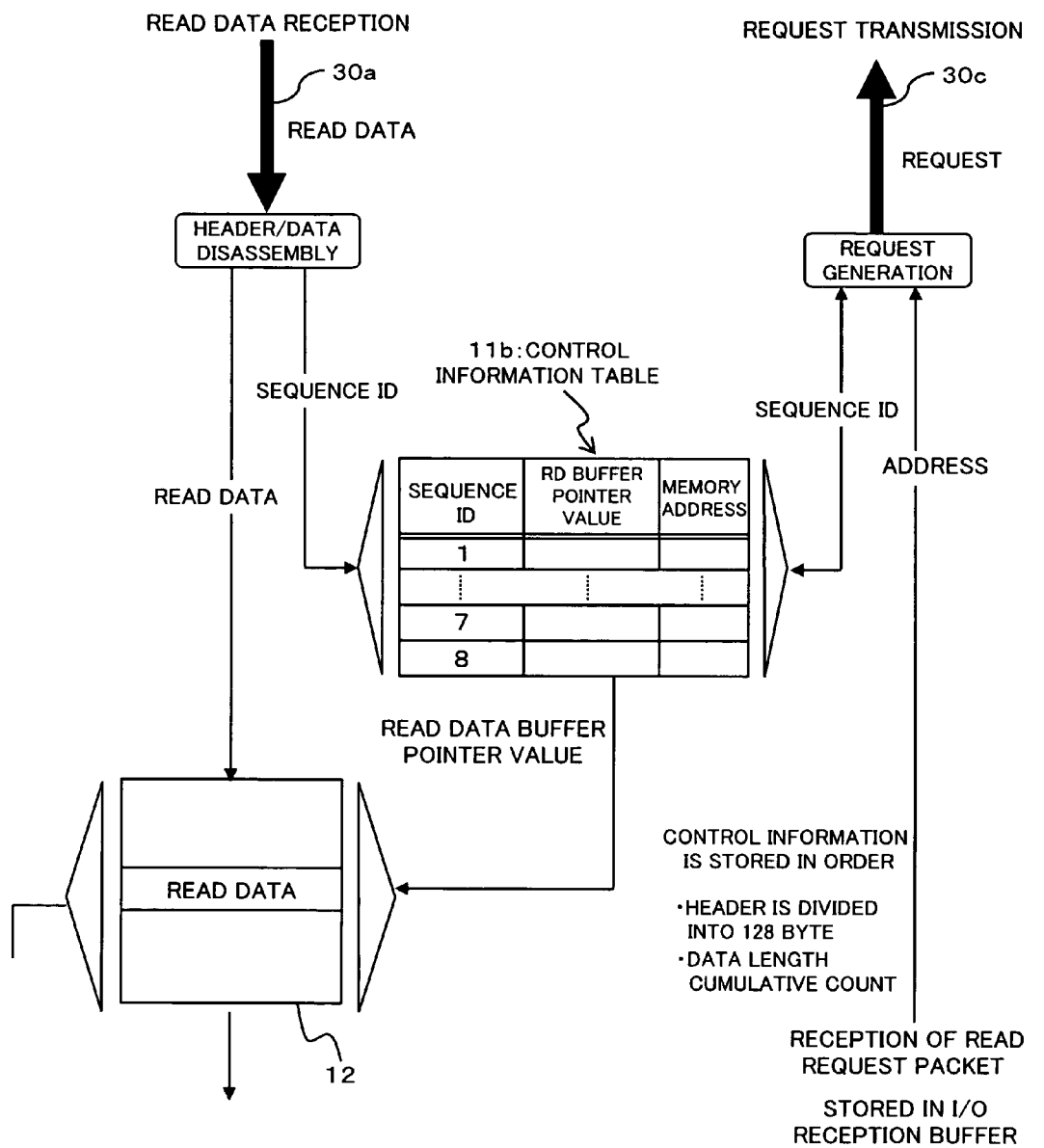
FIG. 7 shows a flow of data at transferring read data in the bus bridge as the second embodiment of the present invention.

FIG. 7 shows the data flow when the read data are transferred in the bus bridge 10b as the second embodiment of the present invention.

In the bus bridge 10b of the second embodiment, a packet received from the I/O bus 31 is written in the I/O reception buffer 15; and the reception data processing section 17 takes out the packet written in the I/O reception buffer 15. Here, when the taken-out packet is a read request, the reception data processing section 17 divides the header into 128 bytes each, and carries out cumulative count of the data length of the read data.

Based on the cumulative count by the reception data processing section 17, the control section 16 registers a pointer value of the read data buffer 12 of the storing area, which is secured beforehand in accordance with the read data length, and other necessary information as the control information in the entry indicated by sequence ID in the control information table 11b.

The control section 16 creates a read request (request) based on the header information divided into 128 bytes each and the sequence ID and transmits the request to the memory bus 30. In the bus bridge 10b of the second embodiment, the read request includes the memory address and the sequence ID; and further, in the read data also, which are received from the memory bus 30 in response to the read request, the sequence ID, which is included in the read request, is attached to the header.

When receiving the read data from the memory bus 30, the read data buffer storing process section 33 breaks down the read data into the header portion and the data portion, and obtains the sequence ID from the header portion. The read data buffer storing process section 33 makes reference to the control information table 11b based on the sequence ID, and obtains the pointer value (storing position information) of the read data buffer of the entry indicated by the sequence ID.

And the read data buffer storing process section 33 writes the read data in a position indicated by the pointer value in the read data buffer 12 using the obtained read data buffer pointer value as the write pointer.

When the read data has been received to fulfill the capacity (transmission packet size condition) of one packet, which is transmitted via the I/O bus 31, in the read data buffer 12, the I/O transmission buffer storing process section 18 reads out the read data of one packet stored in the read data buffer 12, and stores the data as the transmission data in the I/O transmission buffer 14 along with the transmission address of the transmission data.

After that, when the transmission of the read data is permitted by a credit, the bus bridge 10b of the second embodiment transmits the packet of the read data to the I/O bus 31.

As described above, according to the bus bridge 10b as the second embodiment of the present invention, the same working effect as that of the above-described first embodiment is obtained. In addition to that, the following effect is obtained. That is, the sequence ID is attached to the read request transmitted from the control section 16, and the control information table 11b administers the sequence ID, which is associated with the request, and the storing position information with respect to the storing position of the read data corresponding to the request in the read data buffer 12 being caused to correspond to each other. Therefore, even when the read data from the memory bus 30 are received out of the order of the read request (out-of-order), the read data buffer storing process section 33 makes reference to the control information table 11b based on the sequence ID attached to the received read data to obtain storing place for the read data. Accordingly, in the read data buffer 12, the read data can be stored in the order of the read request received from the I/O bus 31.

That is, in the bus bridge 10b of the second embodiment, the out-of-order execution of the read data can be carried out in the memory bus 30.

Also, the pointer value of the read data buffer 12 is stored in the control information table 11b on the basis of each sequence ID. Accordingly, the data can be stored in the read data buffer 12 in the correct order independent of the order of the read data received from the memory bus 30.

Further, the order dependency of the read data, which flows through the memory bus 30, is eliminated. Accordingly, waiting state due to the order restriction of the read data signal line 30a is eliminated. Thus, effective throughput of the memory bus 30 is enhanced.

(C) Description of Third Embodiment

FIG. 8 shows an example of the structure of a control information table in the bus bridge 10c as a third embodiment of the present invention.

In the same manner as the bus bridges 10a of the first embodiment, between the I/O devices 25 and the cross bar switch 24 in the information processing device 1 (refer to FIG. 2), the bus bridges 10c (10c-1, 10c-2) as a third embodiment of the present invention are disposed between the I/O buses 31 and the memory bus 30; and are arranged in such a manner as to carry out the data transfer between the I/O buses 31 and the memory bus 30 which have different protocols such as clock frequency and data length of the data to be transferred therebetween.

The bus bridge 10c of the third embodiment includes a control information table 11c in place of the control information table 11b of the bus bridge 10b of the second embodiment (refer to FIG. 5). The other portions are configured in the same manner as the ones of the bus bridge 10b of the second embodiment.

Hereinafter, in the third embodiment, as for the reference numeral indicating the bus bridge, when one of a plurality of bus bridges has to be specified, reference numerals 10c-1 and 10c-2 will be used; and when an arbitrary bus bridge is specified, reference numeral 10c will be used.

In the bus bridge 10c of the third embodiment, the read pointer of the write data buffer 13 is arranged in such a manner as to operate not only in an incremental manner, but also to be controlled to handle a random value, whereby the data can be taken out from the write data buffer 13 at random; thus, the data retransmission request from the memory bus 30 can be complied with.

Also, in the bus bridge 10c of the third embodiment, in the same manner as the read request in the bus bridge 10b of the second embodiment, the arrangement may be made such that the write requests (maximum, eight) under execution, which are transmitted by the control section 16, are allotted a unique sequence ID respectively; and each of the requests is administered using the sequence ID.

In the bus bridge 10c of the third embodiment, in the same manner as the read data in the bus bridge 10b of the second embodiment, the write data transmitted to the memory bus 30 also has the above-described sequence ID in its packet header portion. Also, the bus bridge 10c of the third embodiment is arranged such that data transmission permission transmitted from the memory bus 30 and the data retransmission request are input in the control section 16.

As shown in FIG. 8, the control table 11c has eight entries; and each of the entries is constituted of a sequence ID, a memory address and a write data buffer pointer value (WD buffer pointer value; storing position information) being caused to correspond to each other as the control information. That is, the control information table 11c administers at least the sequence ID interconnected with a request and the storing position information with respect to the storing position of the write data corresponding to the request in the write data buffer 13 being caused to correspond to each other.

The write data buffer pointer value is the information (position information, pointer value) with which the reception data processing section 17 indicates the position in the write data buffer 13 stored with the data portion (write data) with respect to the write request packet, which is received from the I/O bus 30 (I/O reception signal line 31a) and stored in the I/O reception buffer 15; and is determined when the reception data processing section 17 stores the write data in the write data buffer 13.

In the bus bridge 10c of the third embodiment also, in the same manner as the control information table 11b of the second embodiment, each of the entries of the control table 11c is arranged in such a manner as to be specified by the sequence ID associated with each entry. In the example shown in FIG. 8, each of the eight entries constituting the control table 11b is allotted the sequence ID of a natural number 1 to 8.

And the control table 11c is arranged such that the entry to be used is determined using the sequence ID.

Further, the bus bridge 10c of the third embodiment is arranged such that, with respect to the write request packet received from the I/O bus 30 (I/O reception signal line 31a) and stored in the I/O reception buffer 15, the reception data processing section 17 stores the data portion (write data) in the write data buffer 13, and stores the storing position (write data buffer pointer value) in the write data buffer 13 in the control information table 11c.

The write data transmission section 34 is arranged in such a manner as to, using the sequence ID attached to the write request, make reference to the control information table 11c, read out the pointer value of the write data buffer 13 from the entry corresponding to the sequence ID to determine the storing position of the write data in the write data buffer 13, and transmit the write data stored in the storing position to the memory bus 30 (write data signal line 30b).

Figure 9:
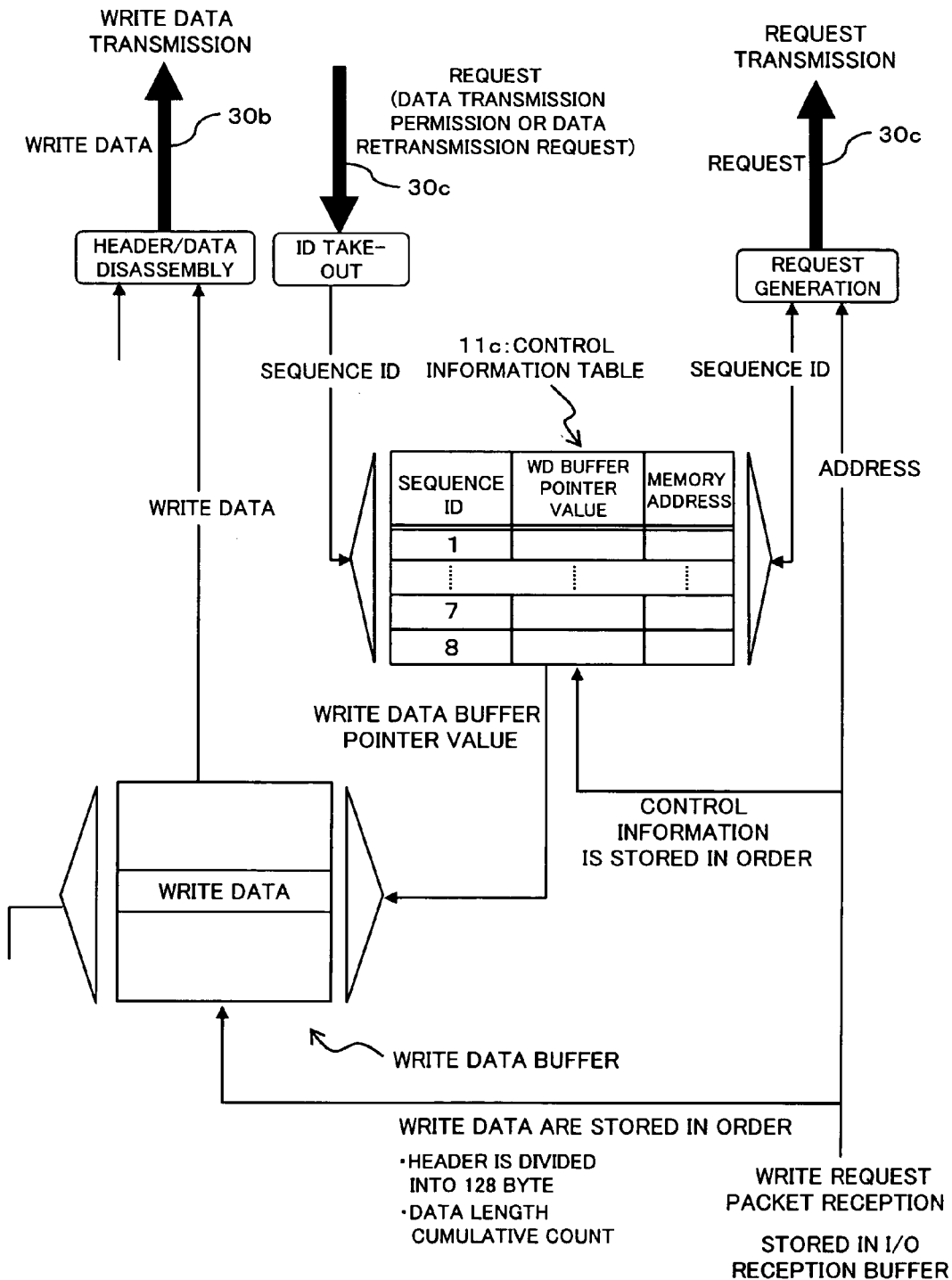
FIG. 9 shows a flow of data at transferring write data in the bus bridge as the second embodiment of the present invention.

FIG. 9 shows the data flow when the write data are transferred in the bus bridge 10c as the third embodiment of the present invention.

In the bus bridge 10c of the third embodiment, the packet received from the I/O bus 31 is written in the I/O reception buffer 15, and the reception data processing section 17 takes out the packet written in the I/O reception buffer 15. Here, when the taken-out packet is a write request, the reception data processing section 17 divides the header into 128 bytes each, performs cumulative count of the data length of the read data and stores the data portion (write data) in the write data buffer 13.

The control section 16 registers the pointer value, which indicates the write data storing position in the write data buffer 13, and other necessary information as the control information in the entry indicated by the sequence ID in the control information table 11c based on the cumulative count by the reception data processing section 17.

Based on the header information divided into 128 bytes each and the sequence ID, the control section 16 creates a write request (request) and transmits the request to the memory bus 30. In the bus bridge 10c of the third embodiment, the write request includes a memory address and a sequence ID. Also, the data transmission permission received from the memory bus 30 in response to the write request and the data retransmission request have a sequence ID attached thereto, respectively, which is attached to the write request, to their header.

When transmitting the write data to the memory bus 30, for example, the control section 16 obtains the sequence ID from the data transmission permission and the data retransmission request received from the memory bus 30, and based on the sequence ID, makes reference to the control information table 11c, and obtains a write data buffer pointer value (storing position) corresponding to the sequence ID.

Using the obtained write data buffer pointer value as a read pointer, the write data transmission section 34 reads out the write data stored in the position indicated by the pointer value in the write data buffer 13, combines the write data with the header, and transmits the data to the memory bus 30 (read data signal line 30a).

The process of the write data transmission in the bus bridge 10c as the third embodiment of the present invention, which is constituted as described above, will be described in accordance with the sequence shown in FIG. 10. The sequence diagram shown in FIG. 10 illustrates the data transfer, which is carried out via memory bus 30 between the bus bridge 10c of the third embodiment and the memory 22.

Figure 10:
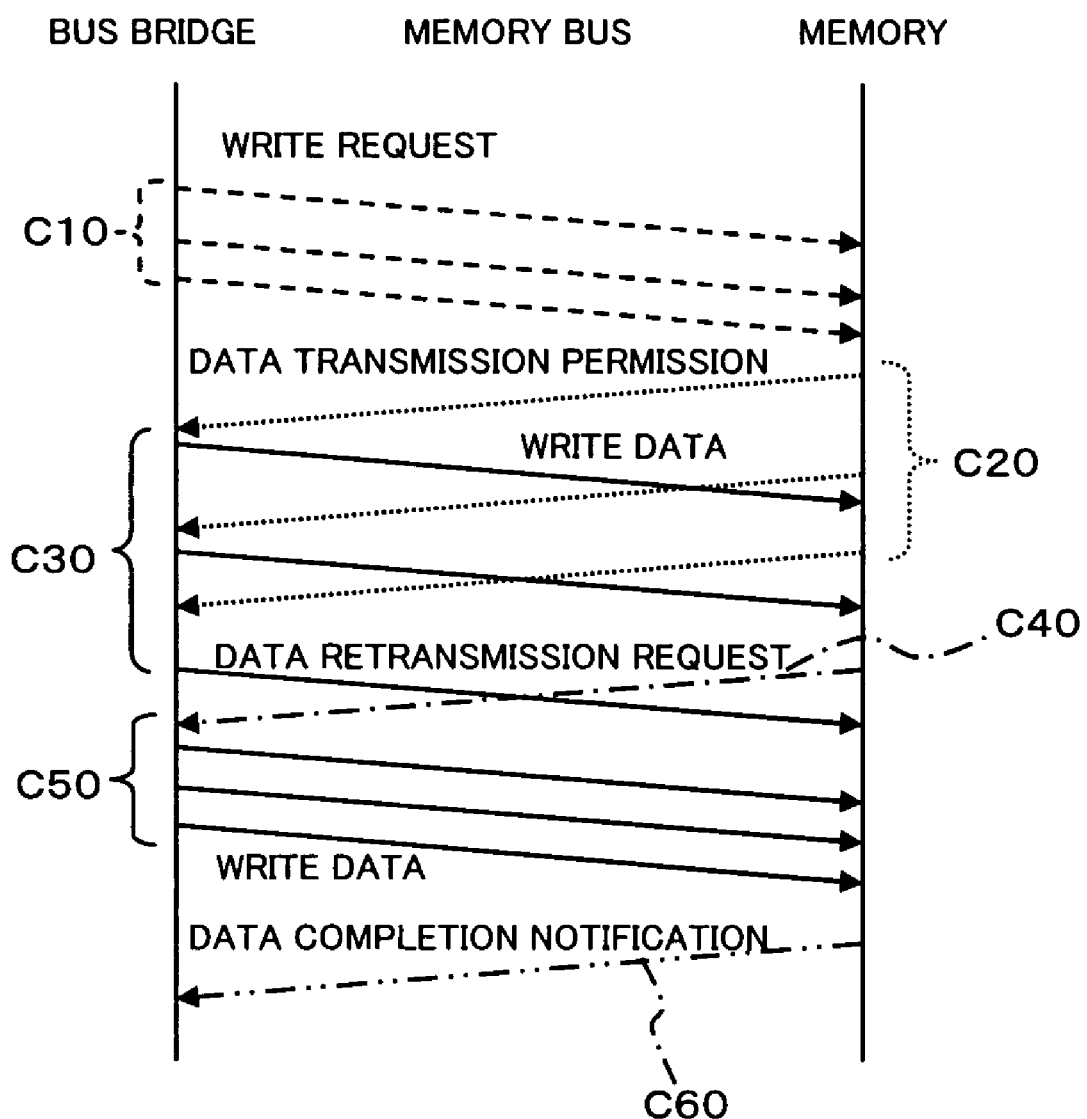
FIG. 10 is a sequence diagram illustrating a process at transferring write data in the bus bridge as the third embodiment of the present invention.

The control section 16 creates a write request based on the header information divided into 128 bytes each, and transmits the request to the memory bus 30 (refer to arrow C10 in FIG. 10). When a data transmission permission is transmitted from the memory 22 in response to the write request (refer to arrow C20 in FIG. 10), in the control information table 11c, the control section 16 obtains the pointer value of the write data buffer 13 from the entry indicated by the sequence ID, which is attached to the data transmission permission.

Using the pointer value as the read pointer, the write data transmission section 34 reads out the write data from the write data buffer 13, and transmits the write data from the bus bridge 10c to the memory 22 via the write data signal line 30b (refer to arrow C30 in FIG. 10).

When the memory 22 has failed to receive the write data for some reason, the memory 22 issues a data retransmission request to the bus bridge 10c (refer to arrow C40 in FIG. 10). The write data transmission section 34 obtains the pointer value of the write data buffer 13 again from the entry indicated by the sequence ID in the control information table 11c, which is attached to the data retransmission request. And using the pointer value as the read pointer, the memory 22 reads out the write data from the write data buffer 13, and transmits the write data again from the bus bridge 10c to the memory 22 via the write data signal line 30b (refer to arrow C50 in FIG. 10).

When the memory 22 has successed to receive the correct write data, the memory 22 transmits a data completion notification to the bus bridge 10c (refer to arrow C60 in FIG. 10). And in the bus bridge 10c, based on the data transfer completion notification, the write data buffer 13 and the control information table 11c are released, and the process is terminated.

As described above, according to the bus bridge 10c as the third embodiment of the present invention, the same working effect as that of the above-described first embodiment is obtained. In addition to that, the following effect is obtained. That is, the sequence ID is attached to the write request transmitted from the control section 16; and the control information table 11c administers the sequence ID associated with a request and the storing position information with respect to the storing position of the write data corresponding to the request in the write data buffer 13 being caused to correspond to each other. Accordingly, for example, even when the data transmission permissions from the memory bus 30 fails to be transmitted in the order of the write request transmitted from the control section 16, by issuing a data retransmission request, the write data transmission section 34 makes reference to the control information table 11c based on the received data transmission permission and the sequence ID attached to the data retransmission request to obtain the storing place of the write data, the write data can be read out from the write data buffer 13 and transmitted therefrom in the order of the data transmission permission or the data retransmission request from the memory bus 30.

That is, in the bus bridge 10c of the third embodiment, the write data can be taken out from the write data buffer 13 at random using the sequence ID, whereby the retransmission function and the out-of-order execution using the sequence ID in the memory bus 30 can be carried out.

Also, in the control information table 11c, the request (sequence ID) and the write data are caused to correspond to each other. Therefore, by deleting the entry from the control information table 11c, the write data can be prevented from being read out. Accordingly, when an error occurs, it is not necessary to read out to delete the data.

(D) Description of Fourth Embodiment

Figure 11:
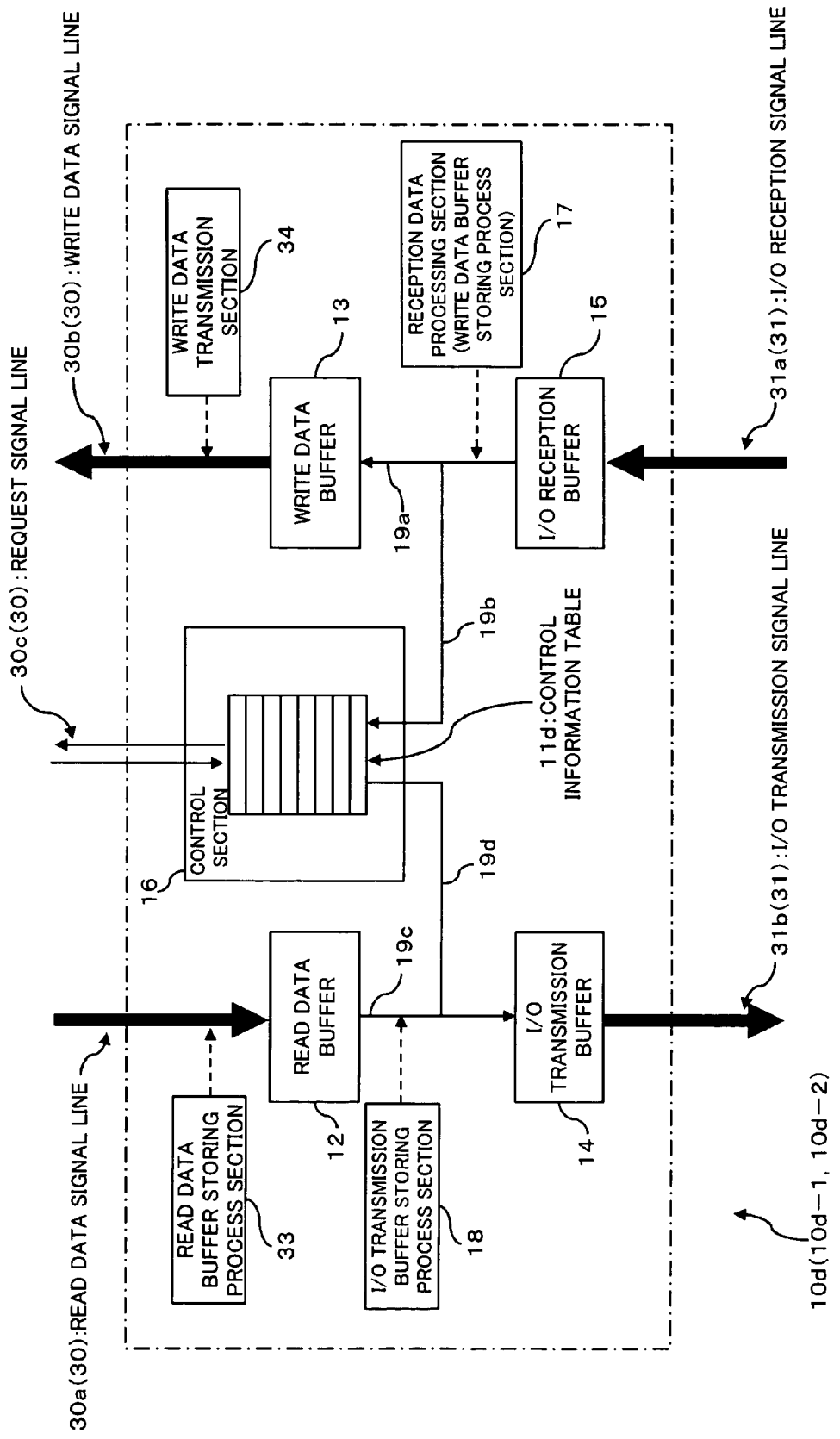
FIG. 11 schematically shows a configuration of a bus bridge as a fourth embodiment of the present invention.

FIG. 11 schematically shows the configuration of a bus bridge 10d as a fourth embodiment of the present invention.

In the same manner as the bus bridges 10a of the first embodiment, between the I/O devices 25 and the cross bar switch 24 in the information processing device 1 (refer to FIG. 2), the bus bridges 10d (10d-1, 10d-2) as the fourth embodiment are disposed between the I/O buses 31 and the memory bus 30. The bus bridges 10d are arranged in such a manner as to perform the data transfer between the I/O bus 31 and the memory bus 30, which have different protocols such as clock frequency and data length of the data to be transferred therebetween.

Hereinafter, in the fourth embodiment, as for the reference numeral indicating the bus bridge, when one of a plurality of bus bridges has to be specified, reference numerals 10d-1, 10d-2 will be used. When specifying an arbitrary bus bridge, reference numeral 10d will be used.

As shown in FIG. 11, a bus bridge 10d of the fourth embodiment includes a control information table 11d in place of the control information table 11a of the bus bridge 10a in the first embodiment. And other portions of the bus bridge 10d are configured in the same configuration as the ones of the bus bridge 10a of the first embodiment. In the figures, the reference numerals identical to the above-described reference numerals indicate the same or substantially same portions. Therefore, detailed description thereof will be omitted.

The control information table 11d has the functions both of the control information table 11b of the bus bridge 10b in the second embodiment and the control information table 11c of the bus bridge 10c in the third embodiment.

Figure 12:
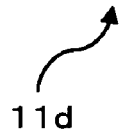
FIG. 12 shows an example of structure of a control information table in a bus bridge as a fourth embodiment of the present invention.

FIG. 12 shows an example of structure of a control information table 11d in the bus bridge 10d as the fourth embodiment of the present invention.

As shown in FIG. 12, the control information table 11d includes eight entries. Each of the entries includes a sequence ID, a memory address, a write data buffer pointer value or read data buffer pointer value (WD/RD buffer pointer value; storing position information) and an identification bit (identification information) as the control information being caused to correspond to each other.

The identification bit is identification information to discriminate whether the relevant transaction is related to a read request (read process) or to a write request (write process). For example, the transaction related to a read request is registered with "1"; and the transaction related to a write request is registered with "0".

That is, the control information table 11d administers at least a sequence ID associated with a request, storing position information with respect to storing position of the write data corresponding to the request in the write data buffer 13 or storing position information with respect to the storing position of the read data corresponding the request in the read data buffer 12 and an identification bit while interconnecting therebetween.

Figure 13:
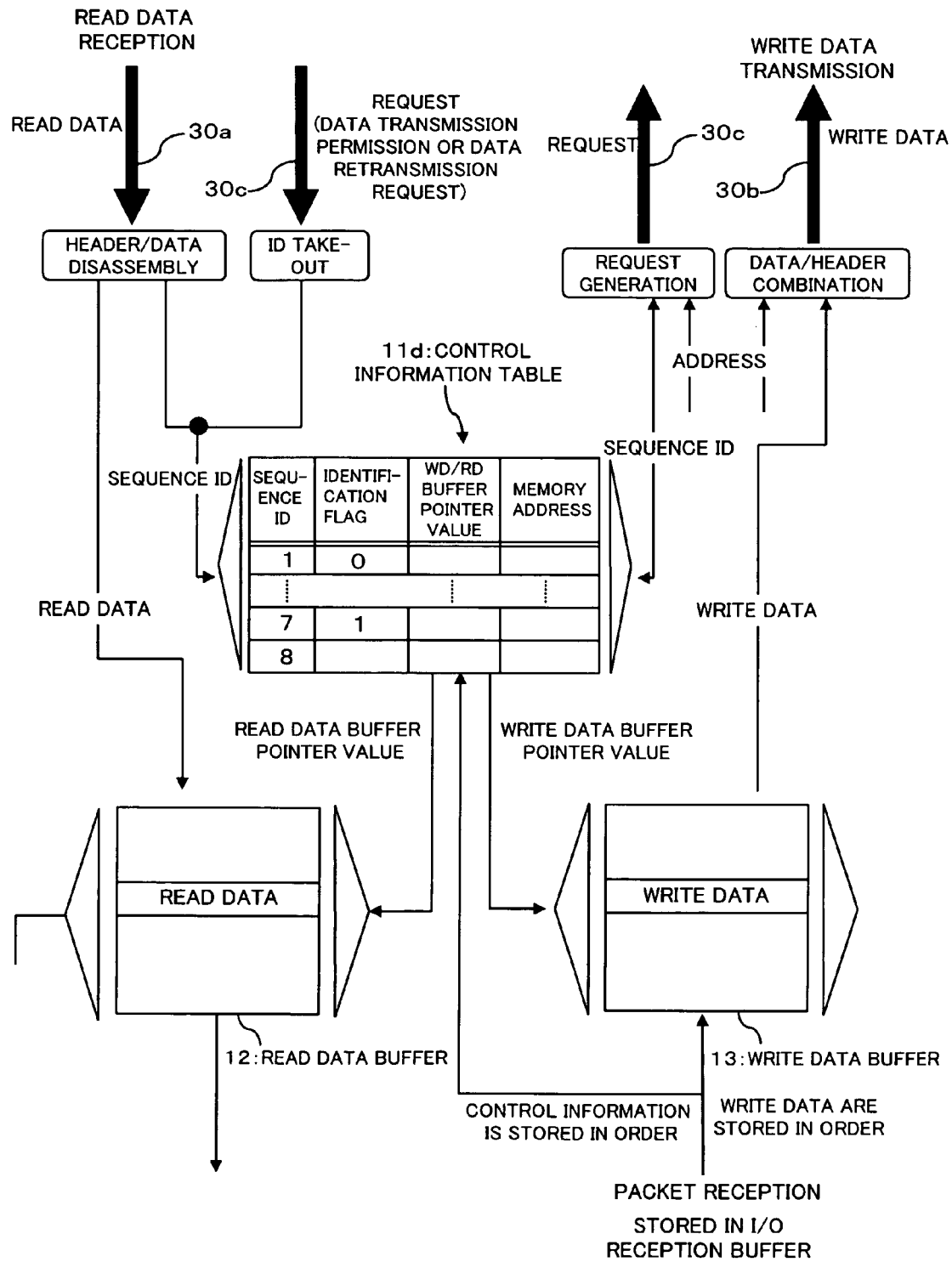
FIG. 13 shows a data flow at transferring read data and write data in the bus bridge in accordance with the fourth embodiment of the present invention.
Figure 14:
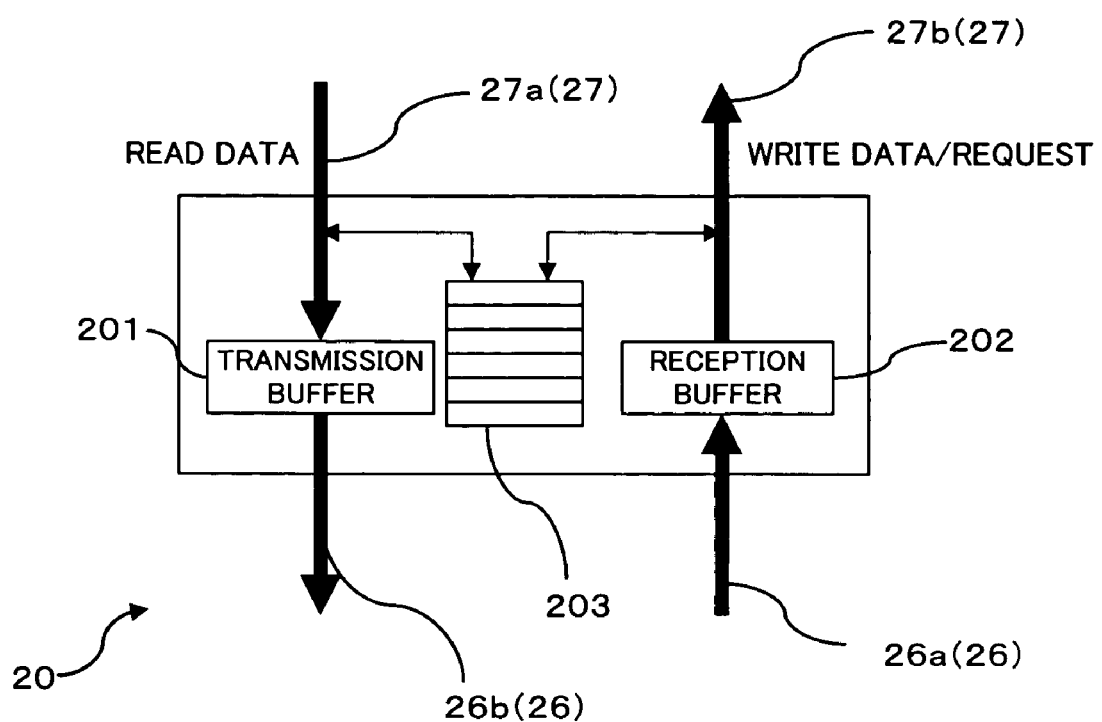
FIG. 14 schematically shows a configuration of a conventional bus bridge.
Figure 15:
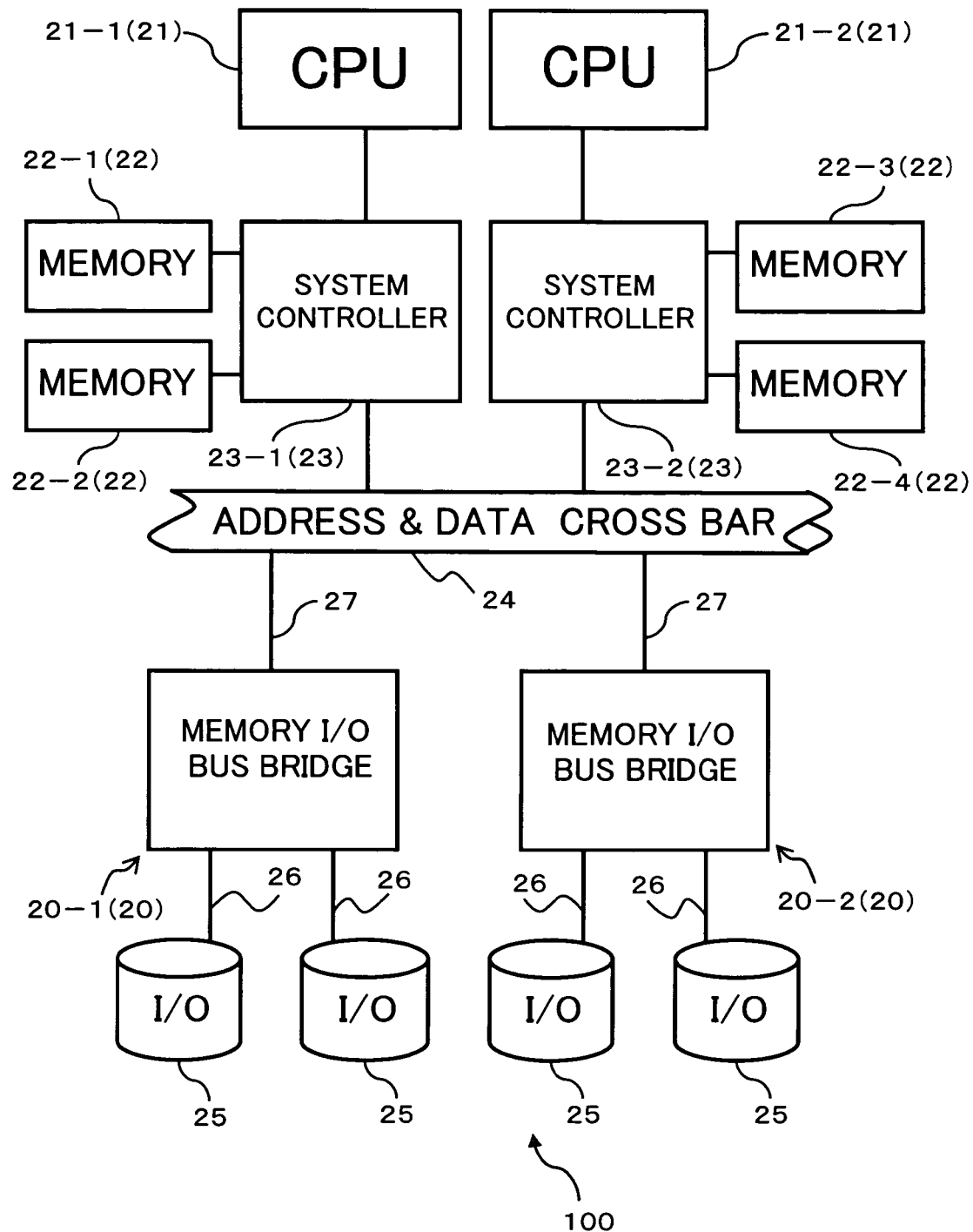
FIG. 15 schematically shows a configuration of an information-processing device equipped with a conventional bus bridge.

FIG. 13 shows the data flow when transferring the read data and the write data in the bus bridge 10d as a fourth embodiment of the present invention. FIG. 13 shows the data flow when transferring the read data in the bus bridge 10b of the second embodiment (refer to FIG. 7) and when transferring the write data in the bus bridge 10c of the third embodiment (refer to FIG. 9) in combination thereof.

In the bus bridge 10d of the fourth embodiment, the packet received from the I/O bus 31 is written in the I/O reception buffer 15; and the reception data processing section 17 takes out the packet written in the I/O reception buffer.

Here, when the taken out packet is a read request, the reception data processing section 17 divides the header into 128 byte each, and carries out cumulative count of the data length of the read data.

Based on the cumulative count by the reception data processing section 17, the control section 16 registers the pointer value indicating the storing area, which is secured beforehand in the read data buffer 12 in accordance with the read data length in an entry which is indicated by the sequence ID in the control information table 11d, and other necessary information as the control information in the control information table 11d; and further, registers an identification bit "1", which indicates that the transaction is a read, while interconnecting with the sequence ID.

On the other hand, when the taken out packet is a write request, the reception data processing section 17 divides the header into 128 bytes each, carries out cumulative count of the data length of the write data and stores the data portion (write data) in the write data buffer 13.

Based on the cumulative count by the reception data processing section 17, the control section 16 registers the pointer value indicating the write data storing position in the write data buffer 13 and other necessary information as the control information in the entry, which is indicated by the sequence ID in the control information table 11d. And at this time, the control section 16 registers the identification bit "0", which indicates the transaction is a write, in accordance with the sequence ID.

In the bus bridge 10d as the fourth embodiment of the present invention, the control section 16 obtains the sequence ID from the read data received from the memory bus 30 or the header of the data transmission permission/data retransmission request, makes reference to control information table 11 based on the sequence ID, and based on the identification bit, determines whether the process relevant to the sequence ID is the process related to the read or process related to the write.

When the process relevant to the sequence ID is the process related to the read, the process is executed in accordance with the flow shown in FIG. 7. And when the process relevant to the sequence ID is the process related to the write, the process is executed in accordance with the flow shown in FIG. 9.

As described above, according to the bus bridge 10d as the fourth embodiment of the present invention, the same working effects as the above-described first to third embodiments can be obtained. In addition to that, the following working effect can be obtained. That is, the control information table 11d can be commonly used in the transactions of read and write; and accordingly, circuit size, mounting space and the like can be reduced.

(E) Others

The present invention is not limited to the above-described embodiments; but may be carried out while variously modifying the invention within a scope of the spirit of the present invention.

For example, in the respective embodiments described above, each of the control information tables 11a, 11b, 11c and 11d includes eight entries. However, the present invention is not limited to that. The control information table may include seven or less or nine or more entries.

Also, in the above-described embodiments, there have been given examples in which the information processing device 1 including two CPUs 21-1 and 21-2, two system controllers 23-1 and 23-2, four memories 22-1 to 22-4 and four I/O devices 25, is provided with two of the bus bridges 10a, 10b, 10c and 10d, respectively, of the embodiments of the present invention. However, the present invention is not limited to the above. The present invention may include the CPUs 21, system controllers 23, memories 22, I/O devices 25 and bus bridges 10a, 10b, 10c, 10d of a number other than the above-described number. The present invention may be carried out while variously modifying the same within the scope of the spirit thereof.

When the embodiments of the present invention are disclosed, it is possible for one skilled in the art to carry out and manufacture the present invention.

The present invention can be applied to the data transfer between two buses having protocols different from each other.

What is claimed is:

1. A data transfer device adapted to transfer data between a memory bus, being connected in such a manner as to be capable of communicating request, write data and read data as a packet respectively in communication with a memory, equipped with a request signal line, a write data signal line and a read data signal line and an input/output bus equipped with a transmission signal line and a reception signal line through which the transmission data and the reception data are transmitted to or received from an input/output apparatus respectively as a packet including transmission data and transmission address of the transmission data and a packet including reception data and reception address of the reception data, comprising:

an input/output reception buffer capable of storing the reception data received from the input/output apparatus through the reception signal line;

an input/output transmission buffer capable of storing the transmission data transmitted to the input/output apparatus through the transmission signal line;

a write data buffer capable of storing the write data to be transmitted to the memory through the write data signal line;

a read data buffer capable of storing the read data received from the memory through the read data signal line;

a control information table having a plurality of entries formed corresponding to the access to the memory;

a write data buffer storing process section that stores the reception data stored in the input/output reception buffer in the write data buffer;

a write data transmission section that transmits the reception data stored in the write data buffer to the memory as the write data through the write data signal line;

a read data buffer storing process section that stores the read data received from the memory in the read data buffer;

an input/output transmission buffer storing process section that reads out the read data stored in the read data buffer and stores the data as the transmission data along with the transmission address of the transmission data into the input/output transmission buffer; and a control section that controls the access to the memory made by the write data transmission section and the read data buffer storing section based on the control information table.

2. The data transfer device according to claim 1, wherein, when performing write processing to transfer data from the input/output apparatus to the memory, the write data transmission section transmits the write data, which is formed by dividing the reception data stored in the write data buffer into a memory access size, through the write data signal line.

3. The data transfer device according to claim 2, wherein the control information table establishes the correspondence between the request and the storing position information where the write data corresponding to the request in the write data buffer are stored and administers them, when transmitting the data to the memory bus, the control section reads out the storing position information in said write data buffer written at the entry of the control information table using the sequence ID as a pointer and takes out the write data from the write data buffer based on the storing position information.

4. The data transfer device according to claim 1, wherein, when performing read processing to transfer the data from the memory to the input/output apparatus, in the event that total data amount of a plurality of the read data stored in the read data buffer satisfies the conditions of transmission packet size, the input/output transmission buffer storing process section reads out the read data stored in the read data buffer, and stores the data in the input/output transmission buffer along with the transmission address of the transmission data as the transmission data.

5. The data transfer device according to claim 2, wherein, when performing read processing to transfer the data from the memory to the input/output apparatus, in the event that total data amount of a plurality of the read data stored in the read data buffer satisfies the conditions of transmission packet size, the input/output transmission buffer storing process section reads out the read data stored in the read data buffer, and stores the data in the input/output transmission buffer along with the transmission address of the transmission data as the transmission data.

6. The data transfer device according to claim 3, wherein, when performing read processing to transfer the data from the memory to the input/output apparatus, in the event that total data amount of a plurality of the read data stored in the read data buffer satisfies the conditions of transmission packet size, the input/output transmission buffer storing process section reads out the read data stored in the read data buffer, and stores the data in the input/output transmission buffer along with the transmission address of the transmission data as the transmission data.

7. The data transfer device according to claim 4, wherein the control information table establishes the correspondence between at least the sequence ID associated with the request and the storing position information with respect to a storing position of the read data corresponding to the request in the read data buffer and administers them, when receiving the read data from the memory bus, the control section reads out the storing position information in said read data buffer written at the entry of the control information table using the sequence ID as the pointer, and stores the read data in the read data buffer based on the storing position information.

8. The data transfer device according to claim 5, wherein the control information table establishes the correspondence between at least the sequence ID associated with the request and the storing position information with respect to a storing position of the read data corresponding to the request in the read data buffer and administers them, when receiving the read data from the memory bus, the control section reads out the storing position information in said read data buffer written at the entry of the control information table using the sequence ID as the pointer, and stores the read data in the read data buffer based on the storing position information.

9. The data transfer device according to claim 6, wherein the control information table establishes the correspondence between at least the sequence ID associated with the request and the storing position information with respect to a storing position of the read data corresponding to the request in the read data buffer and administers them, when receiving the read data from the memory bus, the control section reads out the storing position information in said read data buffer written at the entry of the control information table using the sequence ID as the pointer, and stores the read data in the read data buffer based on the storing position information.

10. The data transfer device according to claim 7, wherein the control information table stores the storing position information of said read data buffer and the storing position information of said write data buffer in the same field, and stores identification information for discriminating the read processing from the write processing in correspondence to the request.

* * * * *